United States Patent
Cullinane et al.

(10) Patent No.: US 12,473,502 B2
(45) Date of Patent: Nov. 18, 2025

(54) METHODS OF VAPOR PRESSURE STABILIZATION OF CRUDE OIL

(71) Applicant: ExxonMobil Technology and Engineering Company, Spring, TX (US)

(72) Inventors: John T. Cullinane, Montgomery, TX (US); Christopher Hardy, Houston, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 322 days.

(21) Appl. No.: 18/462,349

(22) Filed: Sep. 6, 2023

(65) Prior Publication Data
US 2024/0093101 A1 Mar. 21, 2024

Related U.S. Application Data

(60) Provisional application No. 63/375,502, filed on Sep. 13, 2022.

(51) Int. Cl.
| | | |
|---|---|---|
| *C10G 53/04* | (2006.01) | |
| *B01D 3/34* | (2006.01) | |
| *C10G 7/12* | (2006.01) | |

(52) U.S. Cl.
CPC ............ *C10G 53/04* (2013.01); *B01D 3/346* (2013.01); *C10G 7/12* (2013.01); *C10G 2300/4006* (2013.01); *C10G 2300/4012* (2013.01)

(58) Field of Classification Search
CPC ............ C10G 53/04; C10G 7/00; C10G 7/12
See application file for complete search history.

(56) References Cited

U.S. PATENT DOCUMENTS

| | | | | |
|---|---|---|---|---|
| 2018/0066194 A1* | 3/2018 | Soliman | ................ | C10G 31/06 |
| 2018/0187095 A1* | 7/2018 | Soliman | ................ | B03C 11/00 |
| 2022/0064547 A1* | 3/2022 | Soliman | ............ | B01D 19/0036 |
| 2022/0380684 A1* | 12/2022 | Soliman | ................ | B01D 17/06 |
| 2022/0380687 A1* | 12/2022 | Soliman | ................ | C10G 33/02 |
| 2022/0389332 A1* | 12/2022 | Pearce | ............... | B01D 19/0073 |

\* cited by examiner

*Primary Examiner* — Renee Robinson
(74) *Attorney, Agent, or Firm* — Vorys, Sater, Seymour and Pease LLP

(57) ABSTRACT

Methods of crude oil stabilization may include separating crude oil in a bulk separator into a first light hydrocarbon stream, a first water stream, and a first bottoms stream; separating the first bottoms stream in an intermediate pressure separator into a second light hydrocarbon stream, a second water stream, and a second bottoms stream; separating the second bottoms stream in a separator into a third light hydrocarbon stream, a third water stream, and a third bottoms stream; introducing a stripping gas stream comprising methane into the separator; storing the third bottoms stream in a vessel comprising an outlet for a fourth light hydrocarbon stream; treating at least a portion of the first, second, third, and fourth light hydrocarbon streams in a vapor treatment process to form a final light hydrocarbon stream; and recycling at least a portion of the final light hydrocarbon stream to the separator.

18 Claims, 5 Drawing Sheets

METHODS OF VAPOR PRESSURE STABILIZATION OF CRUDE OIL

FIELD OF INVENTION

The present disclosure relates to methods of vapor pressure stabilization of crude oil and, more particularly, vapor pressure stabilization of crude oil utilizing gas stripping.

BACKGROUND

Crude oil or condensate contains a wide array of hydrocarbon components, with carbon numbers extending from as low as a single carbon atom to over 1,000 carbons. Because the contents of a reservoir are pressurized, the extracted crude often contains a significant amount of light ends. The light end components possess a vapor pressure above atmospheric pressure. Said components are likely to vaporize from the liquid crude under typical ambient conditions. The crude would require pressurized storage to maintain the liquid state of the light ends, which is undesirable due to the cost and likelihood of light hydrocarbon emissions. For these reasons, a more common practice is for reservoir fields to contain stabilization units in which the total vapor pressure of the crude is lowered to below atmospheric pressure.

Crude stabilization involves at least partially removing light ends from the crude oil. Removing light ends helps prevent the flashing of the liquid during handling and allows the crude to be stored at atmospheric pressure without significant emission of light hydrocarbons.

Several processes exist to remove light ends from crude oil. One standard method is simple pressure reduction. By lowering the crude pressure below the vapor pressure of the light ends, the vaporized light ends can be removed. However, pressure reduction alone may not be sufficient to stabilize the liquid crude fully. In such cases, a heater treater is often used. A heater treater heats the crude to a higher temperature, thus increasing the vapor pressure of the light ends.

The heat supply for the heater treater is typically produced by the combustion of fuel gas, also known as direct-fired heater treaters. The hot combustion gases are directed through tubes inserted into a pressure vessel. The tubes' surfaces are in direct contact with the crude in the pressure vessel, allowing the combustion gases to heat the crude. Following the heat transfer from the combustion gas to the crude, the cooled combustion gases are vented to the atmosphere. This configuration is common for remote field applications located far from plant utilities or other infrastructure.

Although effective for removing light ends and controlling the vapor pressure of the crude, the direct-fired heater treater suffers from a number of disadvantages. Primarily, the combustion of fuel gas results in the emission of carbon dioxide and uncombusted hydrocarbons. Resultantly, heater treaters contribute to the total site emissions and must be accounted for in air permitting. Also, as fuel gas is a product of oil refining, its combustion consumes some of the final product. Finally, the intense heat from the combustion gas makes the tubes containing the gas susceptible to leaks. This is a safety concern as the tubes are in direct contact with the crude. Loss of containment of the combustion gas or crude poses a significant fire risk.

Due to the numerous disadvantages of using direct-fired heater treaters, the use of electrical heaters to heat the crude has been proposed, and in some instances practiced. The use of an electric heater avoids some of the risks associated with direct-fired heater treaters. However, the scale of many oil and gas producing facilities makes this solution impractical. Electric heating requires a significant amount of power infrastructure and the equipment is often costly, making this alternative economically unattractive.

SUMMARY OF INVENTION

In an aspect, a method is disclosed and includes separating a multi-phase crude oil in a bulk separator into a first light hydrocarbon stream, a first water stream, and a first bottoms stream. The first bottoms stream is separated in an intermediate pressure separator to form a second light hydrocarbon stream, a second water stream, and a second bottoms stream. The method further includes separating the second bottoms stream in a separator into a third light hydrocarbon stream, a third water stream, and a third bottoms stream. A stripping gas stream comprising methane is also introduced into the separator. The third bottoms stream is stored in a vessel with an outlet for a fourth light hydrocarbon stream. At least a portion of the first, second, third, and fourth light hydrocarbon streams are treated in a vapor treatment process to form a final light hydrocarbon stream. Finally, at least a portion of the final light hydrocarbon stream is recycled to the separator to be used as at least a portion of the stripping gas stream.

In an additional aspect, another method is disclosed that includes separating a multi-phase crude oil in a bulk separator into a first light hydrocarbon stream, a first water stream, and a first bottoms stream. The first bottoms stream is separated in a separator into a second light hydrocarbon stream and a second bottoms stream. A stripping gas stream comprising methane is also introduced into the separator. The second bottoms stream is stored in a vessel with outlets for a third light hydrocarbon stream and a second water stream. At least a portion of the first, second, and third light hydrocarbon streams are treated in a vapor treatment process to form a final light hydrocarbon stream. A least a portion of the final light hydrocarbon stream is recycled to the separator to be used as at least a portion of the stripping gas stream.

In another aspect, a method includes separating a multi-phase crude oil in a bulk separator into a first light hydrocarbon stream, a first water stream, and a first bottoms stream. The first bottoms stream is separated in an intermediate pressure separator into a second light hydrocarbon stream, a second water stream, and a second bottoms stream. The second bottoms stream is further separated in a separator into a third light hydrocarbon stream, a third water stream, and a third bottoms stream. A stripping gas stream comprising methane is also introduced into the separator. The third bottoms stream is stored in a vessel with an outlet for a fourth light hydrocarbon stream. At least a portion of the first light hydrocarbon stream is slipped to the separator as at least a portion of the stripping gas stream.

These and other features and attributes of the disclosed methods of the present disclosure and their advantageous applications and/or uses will be apparent from the detailed description which follows.

BRIEF DESCRIPTION OF THE DRAWINGS

To assist those of ordinary skill in the relevant art in making and using the subject matter hereof, reference is made to the appended drawings. The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1A:
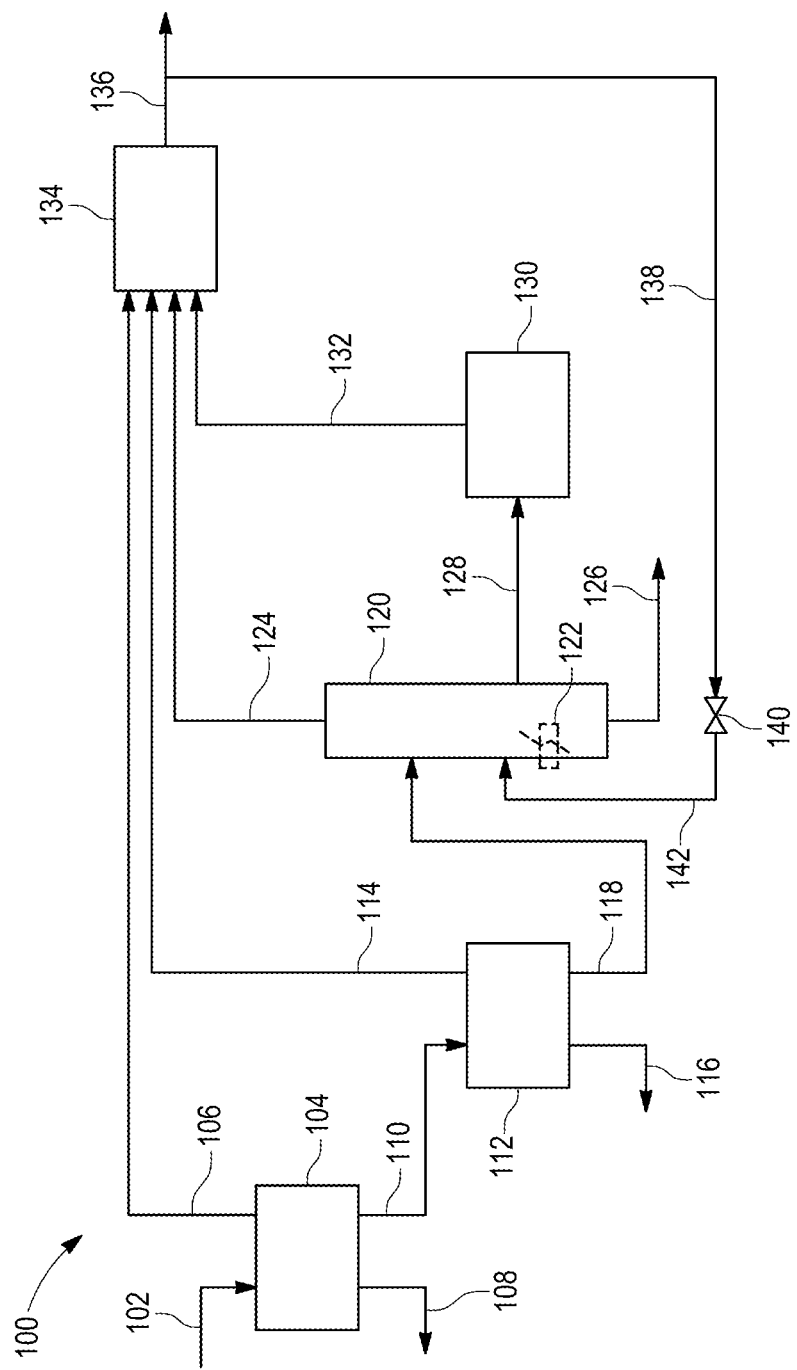
FIGS. 1A, 1B, and 1C illustrate a nonlimiting example of a crude stabilization process flow of the present disclosure.

The present disclosure relates to methods of vapor pressure stabilization of crude oil utilizing gas stripping. For example, a stream comprising gaseous methane may be used to strip light hydrocarbons from the crude. The methane used as the stripping gas may originate from a number of sources, including products of the crude refining process. Further, an electrical heater may optionally be used to enhance the stripping process by promoting the vaporization of the light hydrocarbons.

There are a number of advantages of using stripping as a method to remove light hydrocarbons from crude oil. Many oil refining sites already possess the necessary equipment to accommodate the stripping process. A common process unit is the vapor recovery tower (VRT), where the crude is separated into light hydrocarbon, bottoms, and water streams following heating by the heater treater. By supplying stripping gas to the VRT, the use of the heater treater may be eliminated due to the enhanced light ends removal by the stripping, thus reducing the emissions and safety concerns associated with the combustion of fuel gas. Additionally, stripping instead of heating the crude has the advantage of reducing the consumption of the gas product, as the gas used in the stripping is recombined with the product stream rather than being consumed by combustion. Further, when stripping is used in combination with heating, the stripping may allow for a lower heat duty by the heater.

Definitions

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

The term "$C_n$" hydrocarbon refers to a hydrocarbon with "n" carbon atoms, and "$C_n$-$C_m$ hydrocarbons" represents hydrocarbons having between "n" and "m" carbon atoms. The terms "crude" and "crude oil" are used interchangeably and both refer to hydrocarbons formed primarily of carbon and hydrogen atoms. The hydrocarbons may also include other elements, such as, but not limited to, halogens, metallic elements, nitrogen, oxygen, or sulfur. Hydrocarbons derived from an oil-bearing formation may include, but are not limited to, kerogen, bitumen, pyrobitumen, asphaltenes, resins, oils, or combinations thereof.

The term "hydrocarbon" means a class of compounds containing hydrogen bound to carbon, and encompasses: (i) saturated hydrocarbon, (ii) unsaturated hydrocarbon, (iii) mixtures of hydrocarbons, and including mixtures of hydrocarbon compounds (saturated and/or unsaturated) having different values of n.

As used herein, "feedstock" and "feed" (and grammatical derivatives thereof) are used interchangeably and both refer to a composition that is fed into a process unit. A feedstock may optionally have been pre-treated to modify its disposition.

The term "natural gas liquids" refers to a low-density mixture of hydrocarbon liquids and may be produced by compressing gaseous hydrocarbons.

As used herein, the terms "optional" or "optionally" mean that the subsequently described event or circumstance can or cannot occur and that the description includes instances where said event or circumstance occurs and instances where it does not.

As used herein, "process unit" and "process equipment" are used interchangeably and both refer to individual stages of a process.

The expression "Reid vapor pressure (RVP)" is a common standard for crude oil vapor pressure at 100° F. RVP is measured according to ASTM D323-20a.

As used herein, "crude stabilization," "vapor pressure stabilization," and "stabilization" are used interchangeably and all refer to the lowering of crude oil vapor pressure. Stabilization may be achieved by removing light hydrocarbons from the crude oil.

As used herein, "light hydrocarbons" and "light ends" are used interchangeably and both refer to hydrocarbons having carbon numbers in a range from 1 to 5.

The term "stripping" (and grammatical derivatives thereof) refers to a physical separation process where one or more components are removed from a liquid stream by a vapor stream.

The term "oil and gas reservoir" refers to a well or reservoir that is a subsurface zone that produces oil and/or gas and lacks communication with other reservoirs. As used herein, "oil and gas well" and "oil and gas reservoir" are interchangeable.

Crude Stabilization Systems and Methods

FIG. 1A illustrates a nonlimiting example of a crude stabilization system 100. A stream of crude 102 from an oil and gas reservoir enters a bulk separator 104. The bulk separator 104 comprises a pressure vessel that is used to separate the crude stream 102 into gaseous and liquid components. The gaseous components comprise a first light hydrocarbon stream 106 and the liquid components comprise a first water stream 108 and a first bottoms stream 110. The first bottoms stream 110 may be optionally coupled to additional process units before being introduced from the bulk separator 104 to an intermediate pressure separator vessel 112. The intermediate pressure separator vessel 112 may lower the pressure of the first bottoms stream 110. This reduction in pressure may vaporize at least a portion of the light ends from the first bottoms stream 110. Resultantly, the intermediate pressure separator vessel 112 comprises outlets for a second light hydrocarbon stream 114, a second water stream 116, and a second bottoms stream 118. The second bottoms stream 118 again may be optionally coupled to additional process units before the second bottoms stream 118 is introduced to the separator 120. The separation in the separator 120 results in a third light hydrocarbon stream 124, a third water stream 126, and a third bottoms stream 128. Separator 120 may optionally be heated by electric heater 122. A vessel 130 stores the third bottoms stream 128 and separates any residual vapor from the third bottoms stream 128 to form a fourth light hydrocarbon stream 132. System 100 also comprises a vapor treatment unit 134, in which the first light hydrocarbon stream 106, second light hydrocarbon stream 114, third light hydrocarbon stream 124, and fourth light hydrocarbon stream 132 are processed, producing a final light hydrocarbon stream 136 that is rich in light hydrocarbons. All or a portion of the vapor treatment unit 134 may be physically located near the separator 120, which is described in more detail herein.

At least a portion of the final light hydrocarbon stream 138 may pass through a letdown valve 140 to form a stripping gas 142 that is recycled to the separator 120 to further enhance the separation of the light hydrocarbons from the crude. The stripping gas 142 may strip at least a portion of the light hydrocarbons from the second bottoms stream 118 into the third light hydrocarbon stream 124.

Figure 1B:
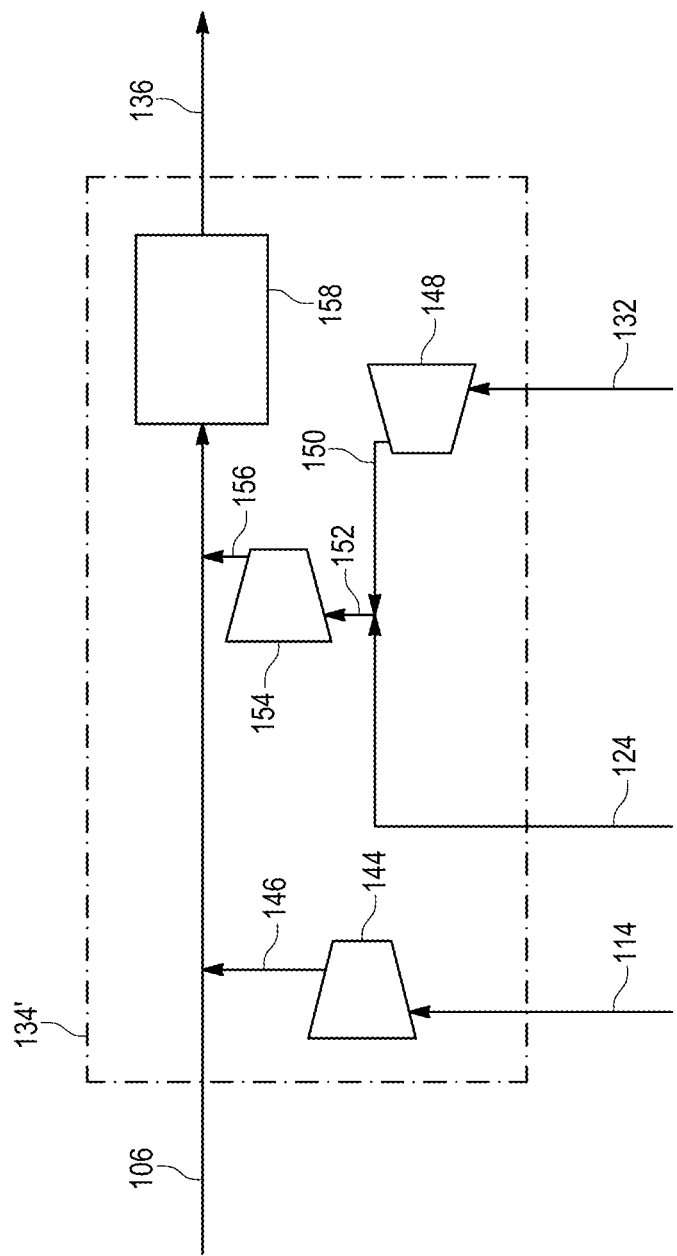

The vapor treatment unit 134 of system 100 may comprise the components of system 134', illustrated in FIG. 1B. System 134' comprises a compressor 144 that compresses the second light hydrocarbon stream 114 to form the first compressed hydrocarbon stream 146. The first compressed hydrocarbon stream 146 is mixed with the first light hydrocarbon stream 106. The fourth light hydrocarbon stream 132 is compressed in a compressor 148 and the resulting second compressed hydrocarbon stream 150 is mixed with the third light hydrocarbon stream 124. The mixture 152 of the second compressed hydrocarbon stream and the third light hydrocarbon stream is further compressed in a compressor 154 to form a third compressed hydrocarbon stream 156. The third compressed hydrocarbon stream 156 is subsequently combined with the first light hydrocarbon stream 106. The mixture of the first light hydrocarbon stream 106, the first compressed hydrocarbon stream 146, and the third compressed hydrocarbon stream 156 enters a natural gas liquids recovery unit 158 that may condense at least a portion of the mixture of streams (e.g., C2+ hydrocarbons, C3+ hydrocarbons, C4+ hydrocarbons, and other heavier hydrocarbons) into the liquid phase. The natural gas liquids recovery unit 158 may comprise a cryogenic processing unit, a fuel gas conditioning skid, a membrane unit, or any combination thereof.

Figure 1C:
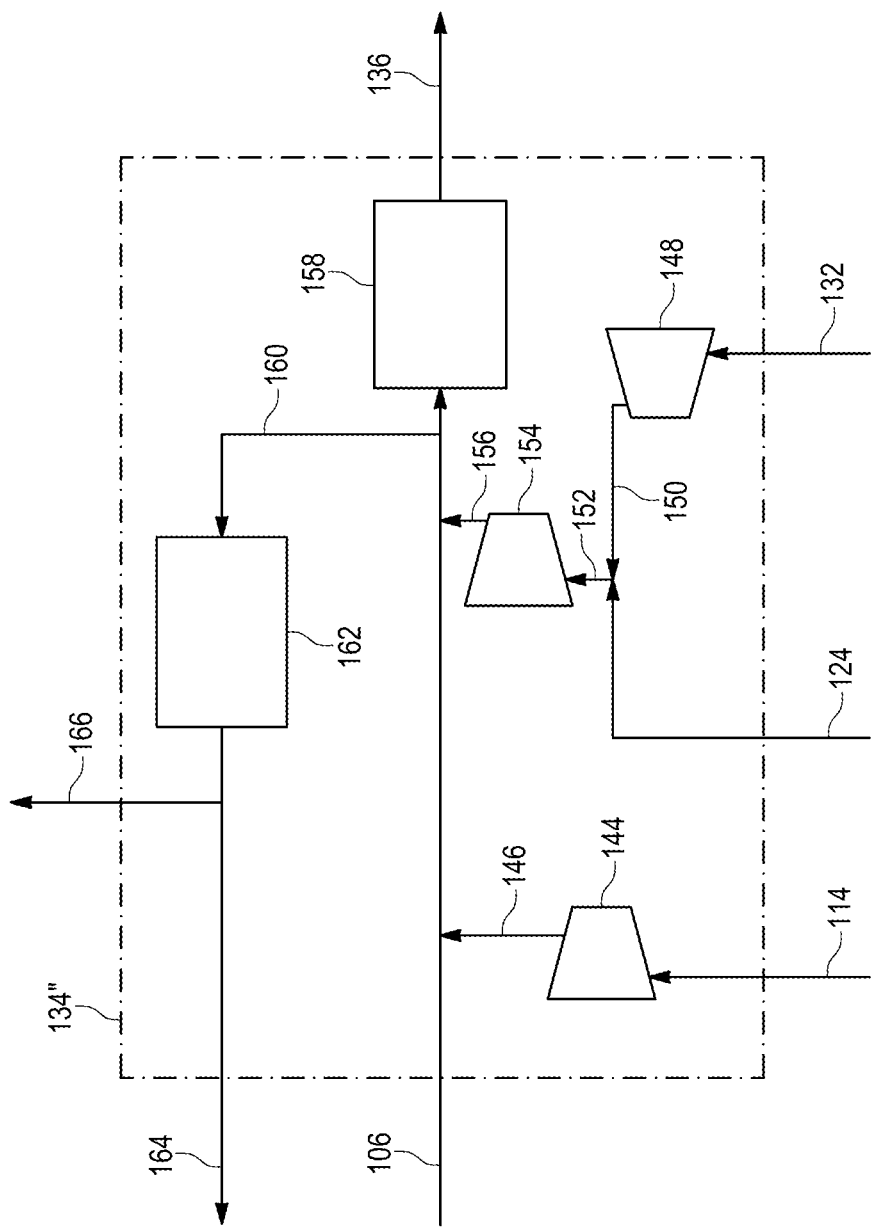

Optionally, the vapor treatment unit 134 of system 100 may instead comprise the components of system 134", as shown in FIG. 1C. System 134" differs from system 134' in its fifth light hydrocarbon stream 160 that is a mixture of the first light hydrocarbon stream 106, the first compressed hydrocarbon stream 146, and the third compressed hydrocarbon stream 156. The additional fifth light hydrocarbon stream 160 may be further conditioned in a fuel gas conditioning unit 162 to produce a methane-rich stream 164. A slipstream 166 of the methane-rich stream 164 may then be optionally combined with the stripping gas 142 or directly supplied to the separator 120 to supplement the stripping.

When the slipstream 166 of the methane-rich stream 164 is recycled back to the separator 120, either directly or after being combined with the stripping gas 142, the portion of the final light hydrocarbon stream 138 may not be recycled back to the separator 120. That is, in an alternate embodiment to FIG. 1A, the vapor treatment unit 134 may have two streams coming therefrom including the final light hydrocarbon stream 136 (illustrated in FIG. 1A) and a slipstream (not illustrated in FIG. 1A) of a methane-rich stream from a fuel gas conditioning unit of the vapor treatment unit 134. The slipstream may be recycled back to the separator 120, either directly or after being combined with the stripping gas 142. A letdown valve or other suitable components may be used in connecting the slipstream with the stripping gas 142 or connecting the slipstream to the separator 120. Further in said alternate embodiment, the portion of the final light hydrocarbon stream 138 may not be present. Accordingly, a natural gas liquids recovery unit 158 of the vapor treatment unit 134 may be located close to or a significant distance from the separator 120.

FIGS. 1A-1C and variations thereof are nonlimiting examples of the crude stabilization process or portions thereof. Other configurations of various streams (including combining streams before introduction to a component of the process) are contemplated. Some example variations to FIGS. 1A-1C are discussed further herein. Additionally, FIGS. 1A-1C are general illustrations and other components may be included in the crude stabilization process to ensure the proper and safe operation thereof. Additional components may include, but are not limited to, valves, heat exchangers, pressure meters, flow rate meters, sensors (e.g., pressure sensors, temperature sensors, flow rates sensors), pumps, additional lines (e.g., pipes or conduits for flowing fluids), and the like, and combinations thereof.

Figure 2:
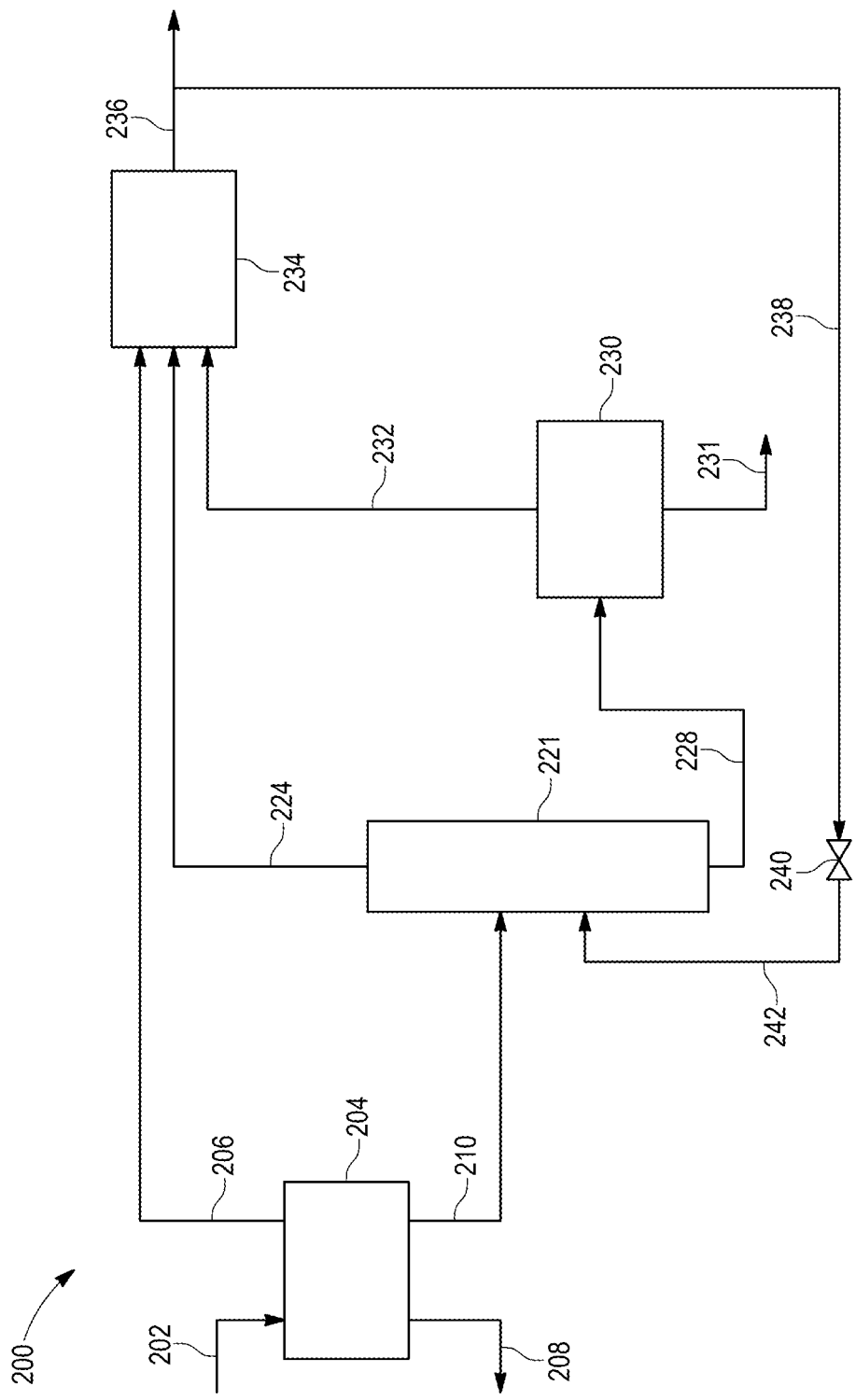
FIG. 2 depicts another nonlimiting example of a crude stabilization process flow of the present disclosure.

FIG. 2 depicts another nonlimiting example of the crude stabilization process. System 200 comprises a stream of crude 202 from an oil and gas reservoir entering a bulk separator 204. The bulk separator 204 comprises a pressure vessel that is used to separate the crude stream 202 into gaseous and liquid components. The gaseous components comprise a first light hydrocarbon stream 206 and the liquid components comprise a first water stream 208 and a first bottoms stream 210. The first bottoms stream 210 may be optionally coupled to additional process units before being introduced. from the bulk separator 204 to a separator 221. At the separator 221, light hydrocarbons are stripped from the first bottoms liquid 210 by a stripping gas, forming a second light hydrocarbon stream 224 and a second bottoms stream 228. Separator 221 may optionally be heated by an electric heater (analogous to electric heater 122 of FIG. 1A). A vessel 230 stores the second bottoms stream 228 and separates any residual vapor and water to form a second water stream 231 and a third light hydrocarbon stream 232, respectively. System 200 also comprises a vapor treatment unit 234, in which the first light hydrocarbon stream 206, second light hydrocarbon stream 224, and third light hydrocarbon stream 232 are processed, producing a final light hydrocarbon stream 236 that is rich in light hydrocarbons. At least a portion of the final light hydrocarbon stream 238 may pass through a letdown valve 240 to form a stripping gas 242 that is recycled to the stripping tower.

The vapor treatment unit 234 of system 200 may optionally comprise the components of system 134' or 134", wherein streams 206, 224, 232, and 236 correspond to streams 106, 124, 132, and 136, respectively. Further, alternative embodiments where only a slipstream of a methane-rich stream from a fuel gas conditioning unit of the vapor treatment unit 234 and not the portion of the final light hydrocarbon stream 238 is recycled to the separator 221 may be implemented in a similar fashion as described above.

FIG. 2 illustrates a nonlimiting example of the crude stabilization process. Other configurations of various streams (including combining streams before introduction to a component of the process) are contemplated. Some example variations to FIG. 2 are discussed further herein. Additionally, FIG. 2 is a general illustration and other components may be included in the crude stabilization process to ensure the proper and safe operation thereof. Additional components may include, but are not limited to, valves, heat exchangers, pressure meters, flow rate meters, sensors (e.g., pressure sensors, temperature sensors, flow rates sensors), pumps, additional lines (e.g., pipes or conduits for flowing fluids), and the like, and combinations thereof.

Figure 3:
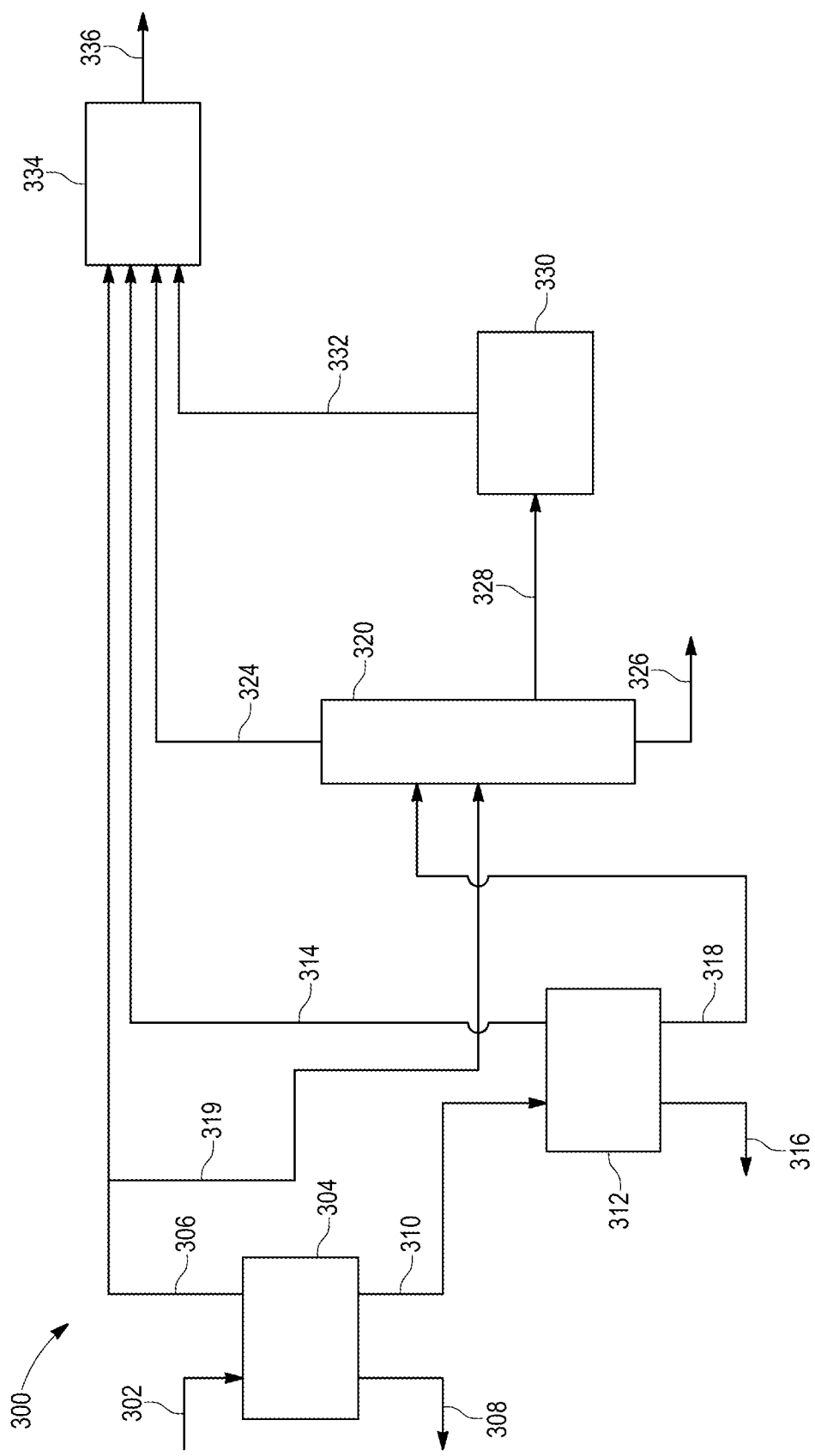
FIG. 3 depicts yet another nonlimiting example of a crude stabilization process flow of the present disclosure.

FIG. 3 illustrates another nonlimiting example of a crude stabilization system 300. A stream of crude 302 from an oil and gas reservoir enters a bulk separator 304. The bulk separator 304 comprises a pressure vessel that is used to separate the crude stream 302 into gaseous and liquid components. The gaseous components comprise a first light hydrocarbon stream 306 and the liquid components comprise a first water stream 308 and a first bottoms stream 310. The first bottoms stream 310 may be optionally coupled to additional process units before being introduced from the bulk separator 304 to an intermediate pressure separator vessel 312. The intermediate pressure separator vessel 312 may lower the pressure of the first bottoms stream 310. This reduction in pressure may vaporize at least a portion of the light ends from the first bottoms stream 310. Resultantly, the intermediate pressure separator 312 comprises outlets for a second light hydrocarbon stream 314, a second water stream 316, and a second bottoms stream 318. The second bottoms stream 318 again may be coupled to additional process units before the second bottoms stream 318 is introduced to the separator 320. Separately, a portion of the first light hydrocarbon stream 306 forms a slip stream 319 that is used as the stripping gas in the separator 320. At the separator 320, light ends are stripped from the second bottoms stream 318 to form a third light hydrocarbon stream 324, a third water stream 326, and a third bottoms stream 328. Separator 320 may optionally be heated by an electric heater (analogous to electric heater 122 of FIG. 1A). A vessel 330 stores the third bottoms stream 328 and separates any residual vapor to form a fourth light hydrocarbon stream 332. System 300 also comprises a vapor treatment unit 334, in which the first light hydrocarbon stream 306, second light hydrocarbon stream 314, third light hydrocarbon stream 324, and fourth light hydrocarbon stream 332 are processed, producing a final light hydrocarbon stream 336 that is rich in light hydrocarbons. At least a portion of the final light hydrocarbon stream 336 may be recycled to the separator 320 as at least a portion of the stripping gas stream, where the recycled final light hydrocarbon may be added directly to the separator 320 or combined with the slip stream 319 before addition to the separator 320.

The vapor treatment unit 334 of system 300 may optionally comprise the components of system 134' or 134", wherein streams 306, 314, 324, 332, and 336 correspond to streams 106, 114, 124, 132, and 136 respectively.

FIG. 3 illustrates a nonlimiting example of the crude stabilization process. Other configurations of various streams (including combining streams before introduction to a component of the process) are contemplated. Some example variations to FIG. 3 are discussed further herein. Additionally, FIG. 3 is a general illustration and other components may be included in the crude stabilization process to ensure the proper and safe operation thereof. Additional components may include, but are not limited to, valves, heat exchangers, pressure meters, flow rate meters, sensors (e.g., pressure sensors, temperature sensors, flow rates sensors), pumps, additional lines or streams (e.g., pipes or conduits for flowing fluids), and the like, and combinations thereof.

The following may provide preferred operating conditions (e.g., temperatures and pressures) for various components and/or streams of the systems and methods of the present disclosure. However, one skilled in the art can appreciate that the operating conditions may vary outside the given ranges based on, for example, location (e.g., on-shore vs. off-shore production), composition of the crude, and the like.

The bulk separator (e.g., bulk separators 104, 204, and 304 of FIGS. 1A, 2, and 3, respectively) may, for example, operate at a temperature of about 70° F. to about 130° F. (or about 70° F. to about 90° F., or about 80° F. to about 100° F., or about 90° F. to about 110° F., or about 100° F. to about 120° F., or about 110° F. to about 130° F.).

Further, the bulk separator (e.g., bulk separators 104, 204, and 304 of FIGS. 1A, 2, and 3, respectively) may, for example, operate at a pressure of about 100 psig to about 150 psig (or about 100 psig to about 120 psig, or about 110 psig to about 130 psig, or about 120 psig to about 140 psig, or about 130 psig to about 150 psig).

The intermediate pressure separator (e.g., intermediate pressure separators 112 and 312 of FIGS. 1 and 3, respectively) may, for example, operate at a temperature of about 70° F. to about 130° F. (or about 70° F. to about 90° F., or about 80° F. to about 100° F., or about 90° F. to about 110° F., or about 100° F. to about 120° F., or about 110° F. to about 130° F.)

Further, the intermediate pressure separator (e.g., intermediate pressure separators 112 and 312 of FIGS. 1 and 3, respectively) may, for example, operate at a pressure of about 30 psig to about 50 psig (or about 30 psig to about 40 psig, or about 40 psig to about 50 psig).

The separator (e.g., separators 120, 221, and 320 of FIGS. 1A, 2, and 3, respectively) may operate, for example, at a pressure of at about 0.5 psig to about 10 psig (or about 0.5 psig to about 5 psig, or about 1 psig to about 6 psig, or about 2 psig to about 7 psig, or about 3 psig to about 8 psig, or about 4 psig to about 9 psig, or about 5 psig to about 10 psig).

The separator (e.g., separators 120, 221, and 320 of FIGS. 1A, 2, and 3, respectively) may, for example, be optionally heated to about 90° F. to about 140° F. (or about 90° F. to about 110° F., or about 100° F. to about 120° F., or about 110° F. to about 130° F., or about 120° F. to about 140° F.) by an electric heater (e.g., electric heater 122 of FIG. 1A).

If an electric heater (e.g., electric heater 122 of FIG. 1A) is not used, the separator (e.g., separators 120, 221, and 320 of FIGS. 1A, 2, and 3, respectively) may, for example, operate at a temperature of about 70° F. to about 130° F. (or about 70° F. to about 90° F., or about 80° F. to about 100° F., or about 90° F. to about 110° F., or about 100° F. to about 120° F., or about 110° F. to about 130° F.).

The separator (e.g., separators 120, 221, and 320 of FIGS. 1A, 2, and 3, respectively) may, for example, comprise a gas-liquid separator, a vapor recovery tower, a stripping tower, the like, or any combination thereof.

For example, the separator (e.g., separators 120, 221, and 320 of FIGS. 1A, 2, and 3, respectively) may comprise trays, packing, or any combination thereof to enhance separation.

The vessel (e.g., vessels 130, 230, and 330 of FIGS. 1A, 2, and 3, respectively) may, for example, operate at about 0 psig to about 1 psig (or about 0 psig to about 0.5 psig, or about 0.1 psig to about 0.6 psig, or about 0.2 psig to about 0.7 psig, or about 0.3 psig to about 0.8 psig, or about 0.4 psig to about 0.9 psig, or about 0.5 psig to about 1 psig).

For example, the vessel (e.g., vessels 130, 230, and 330 of FIGS. 1A, 2, and 3, respectively) may comprise an oil storage tank.

In any example of the crude stabilization process, the first light hydrocarbon stream (e.g., streams 106, 206, and 306 of FIGS. 1A, 2, and 3, respectively) may, for example, comprise about 70 mol % to about 100 mol % (or about 70 mol % to about 90 mol %, or about 80 mol % to about 100 mol %) methane.

Furthermore, the stripping gas stream (e.g., streams 142, 242, 319, and, optionally, 336 of FIGS. 1A, 2, and 3, respectively) may, for example, comprise about 90 mol % to about 100 mol % (or about 90 mol % to about 92 mol %, or about 91 mol % to about 93 mol %, or about 92 mol % to about 94 mol %, or about 93 mol % to about 95 mol %, or about 94 mol % to about 96 mol %, or about 95 mol % to about 97 mol %, or about 96 mol % to about 98 mol %, or about 97 mol % to about 99 mol %, or about 98 mol % to about 100 mol %) methane.

The process of stripping may, for example, enhance the removal of light ends from the crude, which may result in a light hydrocarbon stream (e.g., streams 124, 224, and 324 of FIGS. 1A, 2, and 3, respectively) comprising a higher concentration of $C_2$-$C_5$ hydrocarbons than the stripping gas stream (e.g., streams 142, 242, 319, and, optionally, 336 of FIGS. 1A, 2, and 3, respectively).

The stripping gas (e.g., streams 142, 242, 319, and, optionally, 336 of FIGS. 1A, 2, and 3, respectively) may be combined with a stream comprising methane (e.g., a stream of 95 mol % or greater methane, or a stream of pure methane) and/or with an inert gas (e.g., a stream of nitrogen).

The stripping gas (e.g., streams 142, 242, 319, and, optionally, 336 of FIGS. 1A, 2, and 3, respectively), for example, may be combined with the bottoms liquid feed to the separator (e.g., streams 118, 210, and 318 to separator 120, 221, and 320 of FIGS. 1A, 2, and 3, respectively).

The stripping gas (e.g., streams 142, 242, 319, and, optionally, 336 of FIGS. 1A, 2, and 3, respectively) may be supplied to the separator (separator 120, 221, and 320 of FIGS. 1A, 2, and 3, respectively) by a sparging device, a bubbler, a mix-in pipe, or any combination thereof.

In any example of the crude stabilization process, the final bottoms liquid (e.g., streams 128, 228, and 328 of FIGS. 1A, 2, and 3, respectively) may have a Reid vapor pressure of about 7 psia to about 12 psia (or about 7 psia to about 9 psia, or about 8 psia to about 10 psia, or about 9 psia to about 11 psia, or about 10 psia to about 12 psia).

Additional Embodiments

Embodiment 1. A method comprising separating a multiphase crude oil in a bulk separator into a first light hydrocarbon stream, a first water stream, and a first bottoms stream, separating the first bottoms stream in an intermediate pressure separator into a second light hydrocarbon stream, a second water stream, and a second bottoms stream, separating the second bottoms stream in a separator into a third light hydrocarbon stream, a third water stream, and a third bottoms stream, introducing a stripping gas stream comprising methane into the separator, storing the third bottoms stream in a vessel comprising an outlet for a fourth light hydrocarbon stream, treating at least a portion of the first, second, third, and fourth light hydrocarbon streams in a vapor treatment process to form a final light hydrocarbon stream, and recycling at least a portion of the final light hydrocarbon stream to the separator as at least a portion of the stripping gas stream.

Embodiment 2. The method according to Embodiment 1, wherein the bulk separator operates at a temperature of about 70° F. to about 130° F.

Embodiment 3. The method according to any of Embodiments 1 or 2, wherein the bulk separator operates at a pressure of about 100 psig to about 150 psig.

Embodiment 4. The method according to any of Embodiments 1-3, wherein the intermediate pressure separator operates at a temperature of about 70° F. to about 130° F.

Embodiment 5. The method according to any of Embodiments 1-4, wherein the intermediate pressure separator operates at a pressure of about 30 psig to about 50 psig.

Embodiment 6. The method according to any of Embodiments 1-5, wherein the separator operates at a temperature of about 70° F. to about 130° F.

Embodiment 7. The method according to any of Embodiments 1-6, wherein the separator has an electric heater operably coupled thereto to heat the separator to a temperature of about 90° F. to about 140° F.

Embodiment 8. The method according to any of Embodiments 1-7, wherein the separator operates at a pressure of about 0.5 psig to about 10 psig.

Embodiment 9. The method according to any of Embodiments 1-8, wherein the separator comprises a gas-liquid separator, a vapor recovery tower, a stripping tower, or any combination thereof.

Embodiment 10. The method according to any of Embodiment 1-9, wherein the third light hydrocarbon stream comprises a higher concentration of $C_2$-$C_5$ hydrocarbons than the stripping gas stream.

Embodiment 11. The method according to any of Embodiments 1-10, wherein the stripping gas stream comprises about 90 mol % methane or more.

Embodiment 12. The method according to any of Embodiments 1-11, wherein the first light hydrocarbon stream comprises about 70 mol % methane or more.

Embodiment 13. The method according to any of Embodiments 1-12, wherein the third bottoms stream has a Reid vapor pressure of about 7 psia to about 12 psia.

Embodiment 14. The method according to any of Embodiments 1-13, wherein the vapor treatment process comprises a natural gas liquids recovery unit.

Embodiment 15. The method according to any of Embodiments 1-14, wherein the natural gas liquids recovery unit comprises a cryogenic processing unit, a fuel gas conditioning skid, a membrane unit, or any combination thereof.

Embodiment 16. The method according to any of Embodiments 1-15, further comprising compressing one or more of the first light hydrocarbon stream, the second light hydrocarbon stream, the third light hydrocarbon stream, or the fourth hydrocarbon stream in the vapor treatment process by a compressor.

Embodiment 17. The method according to any of Embodiments 1-16, wherein the separator comprises trays, packing, or any combination thereof to enhance separation.

Embodiment 18. The method according to any of Embodiments 1-17, wherein the stripping gas stream may be supplied to the separator by mixing the stripping gas stream with the second bottoms stream.

Embodiment 19. A method comprising separating a multiphase crude oil in a bulk separator into a first light hydrocarbon stream, a first water stream, and a first bottoms stream, separating the first bottoms stream in a separator into a second light hydrocarbon stream and a second bottoms stream, introducing a stripping gas stream comprising methane into the separator, storing the second bottoms stream in a vessel with outlets for a third light hydrocarbon stream and a second water stream, treating at least a portion of the first, second, and third light hydrocarbon streams in a vapor treatment process to form a final light hydrocarbon stream, and recycling at least a portion of the final light hydrocarbon stream to the separator as at least a portion of the stripping gas stream.

Embodiment 20. The method according to Embodiment 19, wherein the bulk separator operates at a temperature of about 70° F. to about 130° F.

Embodiment 21. The method according to any of Embodiments 19 or 20, wherein the bulk separator operates at a pressure of about 100 psig to about 150 psig.

Embodiment 22. The method according to any of Embodiments 19-21, wherein the separator operates at a temperature of about 70° F. to about 130° F.

Embodiment 23. The method according to any of Embodiments 19-22, wherein the separator operates at a pressure of about 0.5 psig to about 10 psig.

Embodiment 24. The method according to any of Embodiments 19-23, wherein the separator comprises a gas-liquid separator, a vapor recovery tower, a stripping tower, or any combination thereof.

Embodiment 25. The method according to any of Embodiments 19-24, wherein the second light hydrocarbon stream comprises a higher concentration of $C_2$-$C_5$ hydrocarbons than the stripping gas stream.

Embodiment 26. The method according to any of Embodiments 19-25, wherein the stripping gas stream comprises about 90 mol % methane or more.

Embodiment 27. The method according to any of Embodiments 19-26, wherein the first light hydrocarbon stream comprises about 70 mol % methane or more.

Embodiment 28. The method according to any of Embodiments 19-27, wherein the second bottoms stream has a Reid vapor pressure of about 7 psia to about 12 psia.

Embodiment 29. The method according to any of Embodiments 19-28, wherein the vapor treatment process comprises a natural gas liquids recovery unit.

Embodiment 30. The method according to any of Embodiments 19-29, wherein the natural gas liquids recovery unit comprises a cryogenic processing unit, a fuel gas conditioning skid, a membrane unit, or any combination thereof.

Embodiment 31. The method according to any of Embodiments 19-30, further comprising compressing one or more of the first light hydrocarbon stream, the second light hydrocarbon stream, or the third light hydrocarbon stream in the vapor treatment process by a compressor.

Embodiment 32. The method according to any of Embodiments 19-31, wherein the separator comprises trays, packing, or any combination thereof to enhance separation.

Embodiment 33. The method according to any of Embodiments 19-32, further comprising separating the first bottoms liquid stream in an intermediate pressure separator before separating the first bottoms liquid stream in the separator.

Embodiment 34. The method according to any of Embodiments 19-33, wherein the stripping gas stream may be supplied to the separator by mixing the stripping gas stream with the first bottoms stream.

Embodiment 35. A method comprising separating a multiphase crude oil in a bulk separator into a first light hydrocarbon stream, a first water stream, and a first bottoms stream, separating the first bottoms stream in an intermediate pressure separator into a second light hydrocarbon stream, a second water stream, and a second bottoms stream, separating the second bottoms stream in a separator into a third light hydrocarbon stream, a third water stream, and a third bottoms stream, introducing a stripping gas stream comprising methane into the separator; storing the third bottoms stream in a vessel with an outlet for a fourth light hydrocarbon stream, and slipping at least a portion of the first light hydrocarbon stream to the separator as at least a portion of the stripping gas stream.

Embodiment 36. The method according to Embodiment 35, further comprising treating at least a portion of the first, second, third, and fourth light hydrocarbon streams in a vapor treatment process to form a final light hydrocarbon stream.

Embodiment 37. The method according to any of Embodiments 35 or 36, wherein the bulk separator operates at a temperature of about 70° F. to about 130° F.

Embodiment 38. The method according to any of Embodiments 35-37, wherein the bulk separator operates at a pressure of about 100 psig to about 150 psig.

Embodiment 39. The method according to any of Embodiments 35-38, wherein the intermediate pressure separator operates at a temperature of about 70° F. to about 130° F.

Embodiment 40. The method according to any of Embodiments 35-39, wherein the intermediate pressure separator operates at a pressure of about 30 psig to about 50 psig.

Embodiment 41. The method according to any of Embodiments 35-40, wherein the separator operates at a temperature of about 70° F. to about 130° F.

Embodiment 42. The method according to any of Embodiments 35-41, wherein the separator operates at a pressure of about 0.5 psig to about 10 psig.

Embodiment 43. The method according to any of Embodiments 35-42, wherein the separator comprises a gas-liquid separator, a vapor recovery tower, a stripping tower, or any combination thereof.

Embodiment 44. The method according to any of Embodiments 35-43, wherein the third light hydrocarbon stream comprises a higher concentration of $C_2$-$C_5$ hydrocarbons than the stripping gas stream.

Embodiment 45. The method according to any of Embodiments 35-44, wherein the final light hydrocarbon stream comprises about 90 mol % methane or more.

Embodiment 46. The method according to any of Embodiments 35-45, wherein the first light hydrocarbon stream comprises about 70 mol % methane or more.

Embodiment 47. The method according to any of Embodiments 35-46, wherein the third bottoms stream has a Reid vapor pressure of about 7 psia to about 12 psia.

Embodiment 48. The method according to any of Embodiments 35-47, wherein the vapor treatment process comprises a natural gas liquids recovery unit.

Embodiment 49. The method according to any of Embodiments 35-48, wherein the natural gas liquids recovery unit comprises a cryogenic processing unit, a fuel gas conditioning skid, a membrane unit, or any combination thereof.

Embodiment 50. The method according to any of Embodiments 35-49, further comprising compressing one or more of the first light hydrocarbon stream, the second light hydrocarbon stream, the third light hydrocarbon stream, or the fourth hydrocarbon stream in the vapor treatment process by a compressor.

Embodiment 51. The method according to any of Embodiments 35-50, wherein the separator comprises trays, packing, or any combination thereof to enhance separation.

Embodiment 52. The method according to any of Embodiments 35-51, wherein at least a portion of the final light hydrocarbon stream is recycled to the separator as at least a portion of the stripping gas stream.

Embodiment 53. The method according to any of Embodiments 35-52, wherein the stripping gas stream may be supplied to the separator by mixing the stripping gas stream with the second bottoms stream.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Simulations of the processes presented in FIGS. 1A, 1B, 1C, 2, and 3 have been performed assuming an oil flow rate of 10,000 barrels per day to determine the power required of the booster compressor (e.g., unit 144 of FIGS. 1B and 1C) and the separator compressor (e.g., unit 154 of FIGS. 1B and 1C) to meet the required Reid vapor pressure specification of the crude. These calculations have been compared to the compressor power requirements of a conventional stabilization process that uses a heater treater to remove the light ends from the crude before the crude enters a separator (e.g., units 120, 221, or 320 of FIGS. 1A, 2, and 3, respectively) to obtain a crude vapor pressure of 9 psia without the use of a stripping gas.

TABLE 1A

| Crude Inlet Temperature (° F.) | Conventional | | | System 100 | | |
|---|---|---|---|---|---|---|
| | Heat Duty (MMBtu/hr) | Booster Compressor Power (hp) | Separator Compressor Power (hp) | Stripping Gas (MMscfd) | Booster Compressor Power (hp) | Separator Compressor Power (hp) |
| 80 | 2.22 | 11.2 | 51.2 | 1.39 | 6.9 | 272.0 |
| 90 | 1.32 | 8.7 | 41.8 | 0.50 | 6.5 | 130.5 |
| 100 | 0.41 | 6.8 | 34.2 | 0.10 | 6.2 | 54.2 |

TABLE 1B

| Crude Inlet Temperature (° F.) | System 200 | | | System 300 | | |
|---|---|---|---|---|---|---|
| | Stripping Gas (MMscfd) | Separator Compressor Power (hp) | | Stripping Gas (MMscfd) | Booster Compressor Power (hp) | Separator Compressor Power (hp) |
| 80 | 0.92 | 185.7 | | 2.48 | 6.9 | 416.3 |
| 90 | 0.35 | 109.4 | | 0.73 | 6.5 | 160.2 |
| 100 | 0.09 | 66.4 | | 0.12 | 6.2 | 57.4 |

As shown in Table 1, the amount of stripping gas and compressor power required to obtain crude at 9 psia vapor pressure is strongly dependent on the inlet temperature of the crude. However, it is possible to meet the Reid vapor pressure specification given the present configurations.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
separating a multi-phase crude oil in a bulk separator into a first light hydrocarbon stream, a first water stream, and a first bottoms stream;
separating the first bottoms stream in an intermediate pressure separator into a second light hydrocarbon stream, a second water stream, and a second bottoms stream;
separating the second bottoms stream in a separator into a third light hydrocarbon stream, a third water stream, and a third bottoms stream;
introducing a stripping gas stream comprising methane into the separator;
storing the third bottoms stream in a vessel comprising an outlet for a fourth light hydrocarbon stream;
treating at least a portion of the first, second, third, and fourth light hydrocarbon streams in a vapor treatment process to form a final light hydrocarbon stream; and
recycling at least a portion of the final light hydrocarbon stream to the separator as at least a portion of the stripping gas stream.

2. The method of claim 1, wherein the bulk separator operates at a temperature of about 70° F. to about 130° F.

3. The method of claim 1, wherein the bulk separator operates at a pressure of about 100 psig to about 150 psig.

4. The method of claim 1, wherein the intermediate pressure separator operates at a temperature of about 70° F. to about 130° F.

5. The method of claim 1, wherein the intermediate pressure separator operates at a pressure of about 30 psig to about 50 psig.

6. The method of claim 1, wherein the separator operates at a temperature of about 70° F. to about 130° F.

7. The method of claim 1, wherein the separator has an electric heater operably coupled thereto to heat the separator to a temperature of about 90° F. to about 140° F.

8. The method of claim 1, wherein the separator operates at a pressure of about 0.5 psig to about 10 psig.

9. The method of claim 1, wherein the separator comprises a gas-liquid separator, a vapor recovery tower, a stripping tower, or any combination thereof.

10. The method of claim 1, wherein the third light hydrocarbon stream comprises a higher concentration of $C_2$-$C_5$ hydrocarbons than the stripping gas stream.

11. The method of claim 1, wherein the stripping gas stream comprises about 90 mol % methane or more.

12. The method of claim 1, wherein the third bottoms stream has a Reid vapor pressure of about 7 psia to about 12 psia.

13. The method of claim 1, wherein the vapor treatment process comprises a natural gas liquids recovery unit.

14. The method of claim 13, wherein the natural gas liquids recovery unit comprises a cryogenic processing unit, a fuel gas conditioning skid, a membrane unit, or any combination thereof.

15. The method of claim 1, further comprising compressing one or more of the first light hydrocarbon stream, the second light hydrocarbon stream, the third light hydrocarbon stream, or the fourth hydrocarbon stream in the vapor treatment process by a compressor.

16. The method of claim 1, wherein the separator comprises trays, packing, or any combination thereof to enhance separation.

17. A method comprising:
separating a multi-phase crude oil in a bulk separator into a first light hydrocarbon stream, a first water stream, and a first bottoms stream;
separating the first bottoms stream in an intermediate pressure separator into a second light hydrocarbon stream, a second water stream, and a second bottoms stream;
separating the second bottoms stream in a separator into a third light hydrocarbon stream, a third water stream, and a third bottoms stream;
introducing a stripping gas stream comprising methane into the separator;
storing the third bottoms stream in a vessel comprising an outlet for a fourth light hydrocarbon stream; and
slipping at least a portion of the first light hydrocarbon stream to the separator as at least a portion of the stripping gas stream.

18. The method of claim 17, further comprising treating at least a portion of the first, second, third, and fourth light hydrocarbon streams in a vapor treatment process to form a final light hydrocarbon stream.

* * * * *